(12) United States Patent
Ludewig

(10) Patent No.: US 6,408,783 B1
(45) Date of Patent: Jun. 25, 2002

(54) POINTER INSTRUMENT

(75) Inventor: Bernd Ludewig, Hirschberg (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/469,057

(22) Filed: Dec. 21, 1999

(30) Foreign Application Priority Data

Dec. 22, 1998 (DE) .......................................... 198 59 339
Apr. 10, 1999 (DE) .......................................... 199 16 221

(51) Int. Cl.⁷ .............................. G01P 1/08; G01D 13/28
(52) U.S. Cl. ....................................... 116/288; 116/62.1
(58) Field of Search ............................... 116/62.1, 62.2, 116/62.3, 62.4, 284, 286, 287, 288, 303; 362/23, 26, 29, 489

(56) References Cited

U.S. PATENT DOCUMENTS

| | | | | |
|---|---|---|---|---|
| 2,248,325 A | * | 7/1941 | Bacon ........................ | 116/62.1 |
| 3,300,572 A | * | 1/1967 | Dahlgren et al. ............. | 174/69 |
| 3,909,670 A | * | 9/1975 | Wakamatsu et al. ......... | 315/276 |
| 4,163,428 A | * | 8/1979 | Ishikawa ..................... | 116/288 |
| 4,761,715 A | * | 8/1988 | Brooks ........................ | 116/286 |
| 5,142,456 A | * | 8/1992 | Murphy ....................... | 362/26 |
| 5,201,277 A | | 4/1993 | Aoki et al. ................... | 116/286 |
| 5,372,087 A | * | 12/1994 | Kato et al. ................... | 116/288 |
| 5,531,181 A | * | 7/1996 | Cookingham ............... | 116/288 |
| 5,669,692 A | | 9/1997 | Thorgersen et al. ......... | 362/556 |
| 5,806,954 A | * | 9/1998 | Butt et al. ..................... | 362/26 |
| 6,314,908 B1 | * | 11/2001 | Olibrich et al. .............. | 116/288 |

FOREIGN PATENT DOCUMENTS

| | | |
|---|---|---|
| DE | 29622834 | 7/1997 |
| DE | 19615499 | 10/1997 |
| DE | 19622383 | 12/1997 |
| EP | 0811827 | 12/1997 |

* cited by examiner

Primary Examiner—Diego Gutierrez
Assistant Examiner—R. Alexander Smith
(74) Attorney, Agent, or Firm—Martin A. Farber

(57) ABSTRACT

In a pointer instrument (1) having a disk pointer (3) which can be illuminated by a light source (6) and is mounted at its periphery, a flexible lead (8) is used for the power supply. For this purpose, the lead (8) has a 180° bend (9), so that a first leg (10) rests against a rear (11) of the disk pointer (3) and a second leg (12) rests against a rear component (13). When the disk pointer (3) is deflected, the lead (8) is able to roll on the rear (11). As it does so, only slight restoring forces are produced and, at the same time, the space requirement is low, it being possible in particular for the central area to be used for further components.

9 Claims, 1 Drawing Sheet

U.S. Patent
Jun. 25, 2002
US 6,408,783 B1

POINTER INSTRUMENT

FIELD AND BACKGROUND OF THE INVENTION

The invention relates to a pointer instrument, especially for a vehicle, having a disk pointer which can be illuminated by a light source, the disk pointer being designed in particular like a circle or circular ring and being connected to a flexible lead.

Such a pointer instrument, in which the disk pointer is designed such that it can be pivoted about an immovable pointer axis, and in which the pointer flag is applied as a mark on the disk pointer, is increasingly used nowadays, above all in the vehicle industry, and thus belongs to the prior art.

In such a pointer instrument, the pointer axis is connected to the pointer instrument such that it cannot rotate and has a comparatively large diameter, so that, for example, a further display designed as a liquid-crystal display can be fitted to a front face of the disk pointer, at the center of the pointer instrument, so that it can easily be read by an observer.

Furthermore, embodiments of such a pointer instrument are known in which the disk pointer, which may be annular, for example, is mounted at its periphery, and therefore even the central pointer axis is dispensed with.

While in the case of conventional pointer instruments having a pointer shaft deflecting a pointer flag, the flexible lead is led spirally around the pointer shaft and, as a result, is wound up or unwound by the latter as the pointer is deflected, this can be implemented only to an inadequate extent in one of the above embodiments.

In this case, in the case of a lead which is laid at the periphery of the disk pointer, it proves to be disadvantageous that a large difference in length of the lead has to be compensated for during the deflection of the disk pointer. At the same time, the transmission of restoring forces from the lead to the disk pointer must be ruled out, so that additional measures, such as a multiple spiral winding, must be provided. As a result, both the space requirement and the outlay on production are relatively high.

In an embodiment in which the lead is laid essentially freely through the space between the disk pointer and the components located underneath, by contrast it proves to be disadvantageous that jamming or damage can easily occur during any pivoting movement of the disk pointer.

SUMMARY OF THE INVENTION

The invention is based on the problem of configuring a pointer instrument of the type mentioned at the beginning in such a way that the lead can be arranged simply and at the same time protected against damage.

According to the invention, this problem is solved by the lead running at least approximately concentrically curved in relation to the disk pointer and having two legs joined by a 180° bend and running at a distance above each other, the first leg resting against a rear of the disk pointer and the second leg being fixed to a rear component of the pointer instrument, with an axial spacing from the disk pointer.

As a result, during the pivoting movement of the disk pointer, the lead is unrolled on the rear of the latter, so that, on the one hand, an exact movement path is predefined without the risk of damage and, on the other hand, the space requirement is very low. As a result of the concentric curvature of the lead, the latter follows the circular path predefined by the pivoting movement of the disk pointer. There is therefore no production of transverse forces in the direction of the center of the disk pointer which could lead to the lead sliding on the rear of the disk pointer. In this case, in particular the central area and the periphery of the disk pointer are not restricted by the course of the lead.

As a result of this, the lead can also be used without problems in the case of a disk pointer which is mounted at its periphery and therefore does not have a central axis or shaft. In this case, the restoring forces produced by the lead as a result of its bending and acting on the disk pointer are low.

Another particularly advantageous embodiment of the invention is also provided when there is arranged on the rear of the disk pointer a ledge, against which the lead rests with one side pointing toward the center of the disk pointer.

This ledge extends at least so as to correspond to the maximum deflection of the disk pointer and therefore prevents the lead slipping toward the center. For this purpose, the ledge can be designed as a stop and, for example, can additionally be provided with an inclined face, which simplifies the action of laying the lead against the rear of the disk pointer and permits its exact guidance.

In this case, a particularly well-suited development of the invention is provided by the disk pointer having a groove which is arranged on its rear and in which the lead rests.

As a result, the lead is optimally protected against damage and, for its part, does not hamper the functioning of the disk pointer. At the same time, this development permits a space-saving implementation in which the lead can be inserted such that it is set back in the groove. For this purpose, the groove can have additional insertion aids, for example inclined faces or chamfers, by which means guiding the lead can be further improved.

A particularly advantageous embodiment of the invention is also provided by the lead being an electric conductor track applied to a film.

As a result, the lead has a thickness which is only very low and at the same time has a high flexibility, which can be pronounced to different extents in different directions. Therefore, the guide elements which are otherwise necessary to maintain an exact movement path can largely be dispensed with. It is also possible, for example, for the conductor track to make direct contact with the light source at one end.

It is also particularly advantageous in this case if the light source is a light-emitting diode inserted into a recess arranged off-center in the disk pointer. This makes an extremely flat design of the disk pointer possible, the light-emitting diode needing to be covered only by a translucent pointer flag. At the same time, the central area of the disk pointer remains free of components and can thus be used in an optimum manner for further displays.

On the other hand, another particularly effective embodiment of the invention is also achieved by the lead being designed as an optical waveguide. By this means, the light from a light source arranged in the rear area of the pointer instrument can be coupled into the optical waveguide and can be coupled out of the front side of the disk pointer. The optical waveguide can also merge in this case into a light output coupling face formed as a pointer flag, so that the number of components needed can be reduced, it being in particular unnecessary to provide any light source on the disk pointer. At the same time, the light source can also emit light into a number of optical waveguides for the purpose of illuminating different displays.

It is also particularly expedient if the rear component is a printed circuit board. As a result, contact can be made directly with the lead, or the lead can be connected to a light source. In this case, for example, a zero-force plug known per se makes assembly easier and, in the event of servicing, permits easy replacement.

Another particularly expedient refinement of the invention is provided by the disk pointer being designed to be essentially transparent and, on its rear, in the area where the lead can be placed on it, having a section with a reduced transmission.

By this means, the lead, which rests against the rear of the disk pointer, in particular during any deflection of the disk pointer, cannot be perceived by an observer. For this purpose, the section can be provided, for example, with a coating or a textured surface.

This section having a reduced transmission is achieved in a particularly advantageous development of the invention by the section being designed as an annular recess and thus being able to be made without trouble in a common machining step with the ledge or groove.

BRIEF DESCRIPTION OF THE DRAWING

The invention permits various embodiments. In order to illustrate its basic principle further, one of these is illustrated in the drawing and will be described below.

In the figures of the drawing.

DETAILED DESCRIPTION OF THE PREFERRED EMBODIMENT

Figure 1:
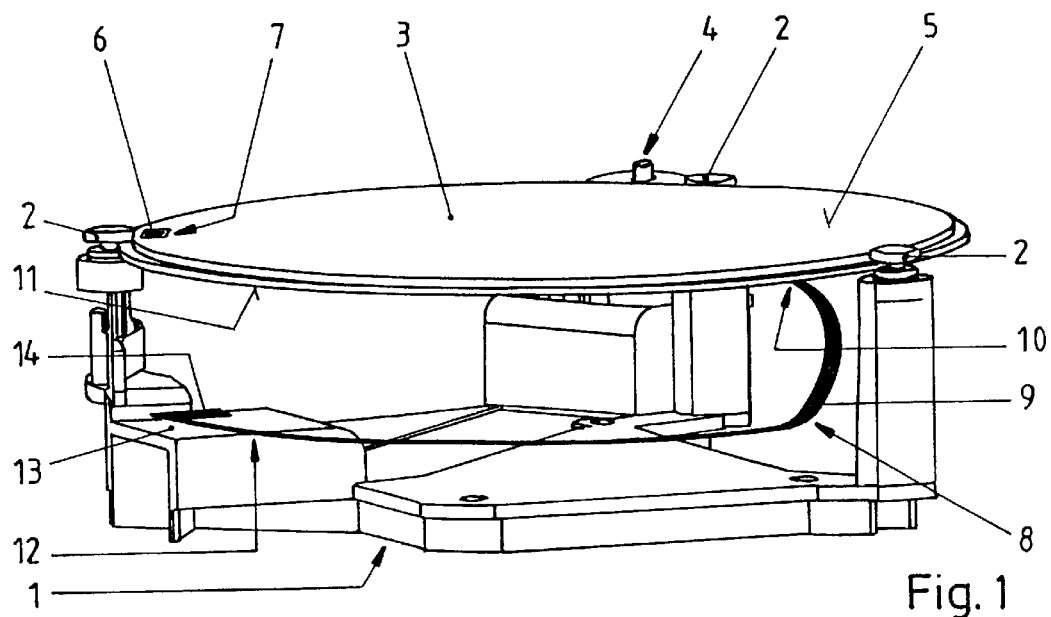
FIG. 1 shows a perspective illustration of a pointer instrument according to the invention.

FIG. 1 shows a perspective illustration of a pointer instrument 1 which, for example, can be incorporated into a combined instrument in a motor vehicle. The pointer instrument 1 has a disk pointer 3 which is mounted between three guide rollers 2 and which can be rotated by means of a pointer drive 4. The pointer drive 4 can be, for example, a gearwheel which is driven by means of a stepping motor and which engages in teeth arranged on the periphery of the disk pointer 3 in order to transmit a rotary motion. On a front side 5 of the circular disk pointer 3, the side visible to an observer, a light source 6 designed as a light-emitting diode is inserted into a recess 7. In order to supply power to the light source 6, a flexible lead 8 is used. This lead 8, designed as a concentrically curved conductor track, has a 180° bend 9, which joins a first leg 10, which is only partially visible in FIG. 1 and rests against a rear 11 of the disk pointer 3, to a second leg 12, which rests against a rear component 13 of the pointer instrument 1 and makes contact with the latter by means of a plug-in connection 14.

Figure 2:
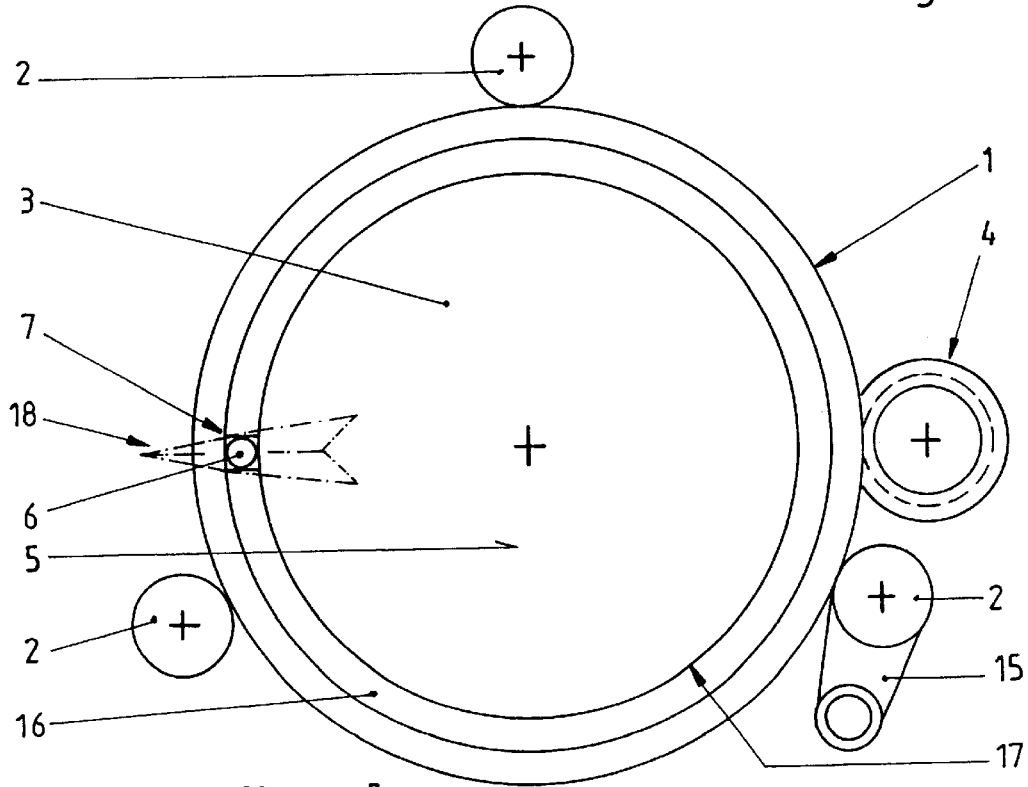
FIG. 2 shows a plan view of the pointer instrument in an enlarged illustration of the principle.

FIG. 2 shows the pointer instrument 1 in a simplified plan view. It is possible to see the three guide rollers 2, distributed approximately uniformly around the periphery, which are used to mount the circular and essentially transparent disk pointer 3. In order to compensate for tolerances and thermal expansion, one of the guide rollers 2 is arranged on a swinging arm 15 and is prestressed with respect to the disk pointer 3 by means of a spring element (not illustrated). Since FIG. 2 merely shows an illustration of the principle, the arrangement of the pointer drive 4 and of the guide rollers 2 with and without swinging arm 15 differs somewhat here from the illustration in FIG. 1, but the technical function is identical.

In addition, the pointer drive 4 engages in the disk pointer 3. Through the transparent disk pointer 3 it is possible to see a coaxial groove 16 which runs in the rear 11 of said disk pointer 3 and against the base of which groove the lead 8 illustrated in FIG. 1 rests and is bounded toward the center by a ledge 17. Arranged on the front side 5 of the disk pointer 3 is the recess 7 for the light source 6, which is designed so as to emit light into a pointer flag 18 which is illustrated, merely by way of example, by a dashed line.

Figure 3:
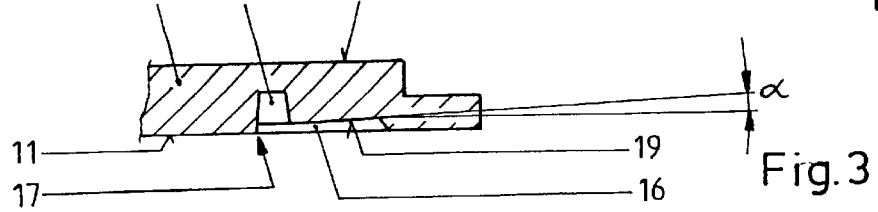
FIG. 3 shows a sectioned side view of a disk pointer of the pointer instrument.

FIG. 3 shows the disk pointer 3, of which only a detail is illustrated, in a sectioned side view. On the rear 11 of the disk pointer 3 it is possible to see the groove 16, against whose inclined face 19, which is inclined at the angle a with respect to the disk pointer 3, the lead (not illustrated) can be laid. In an area of the ledge 17 of the groove 16 which points toward the center of the disk pointer 3, the disk pointer 3 has a section 20, implemented as a depression, with a reduced transmission. The depression causes a reflection, so that the lead inserted into the groove 16 is invisible to an observer through the front side 5 of the disk pointer 3.

As a result of the above-described configuration of the pointer instrument 3, exact guidance of the lead 8 in the groove 16 is possible. At the same time, the space requirement for this arrangement is low, as are the restoring forces acting on the disk pointer 3 as a result of the lead.

I claim:

1. A pointer instrument, having a disk pointer which is illuminatable by a light source, the disk pointer being formed in one of a circle or circular ring and being connected to a flexible lead, wherein the lead (8) runs at least approximately concentrically curved in relation to the disk pointer (3) and has two legs (10, 12) joined by a 180° bend (9), a first of said legs (10) resting against a rear (11) of the disk pointer (3) and a second of said legs (12) being fixed to a rear component (13) of the pointer instrument (1), with an axial spacing from the disk pointer (3).

2. The pointer instrument as claimed in claim 1, wherein the lead (8) is an electric conductor track applied to a film.

3. The pointer instrument as claimed in claim 1, wherein the light source (6) is a light-emitting diode inserted into a recess (7) arranged off-center in the disk pointer (3).

4. The pointer instrument as claimed in claim 1, wherein the lead (8) is an optical waveguide.

5. The pointer instrument as claimed in claim 1, wherein the rear component (13) is a printed circuit board.

6. A pointer instrument having a disk pointer which is illuminatable by a light source, the disk pointer being formed in one of a circle or circular ring and being connected to a flexible lead, wherein the lead (8) runs at least approximately concentrically curved in relation to the disk pointer (3) and has two legs (10, 12) joined by a 180° bend (9), a first of said legs (10) resting against a rear (11) of the disk pointer (3) and a second of said legs (12) being fixed to a rear component (13) of the pointer instrument (1), with an axial spacing from the disk pointer (3) and wherein there is arranged on the rear (11) of the disk pointer (3) a ledge (17), against which the lead (8) rests with one side pointing toward a center of the disk pointer (3).

7. A pointer instrument having a disk pointer which is illuminatable by a light source, the disk pointer being formed in one of a circle or circular ring and being connected to a flexible lead, wherein the lead (8) runs at least approximately concentrically curved in relation to the disk pointer (3) and has two legs (10, 12) joined by a 180° bend (9), a first of said legs (10) resting against a rear (11) of the disk pointer (3) and a second of said legs (12) being fixed to a rear component (13) of the pointer instrument (1), with an axial spacing from the disk pointer (3) and wherein the disk pointer (3) has a groove (16) which is arranged on its rear (11) and in which the lead (8) rests.

8. A pointer instrument having a disk pointer which is illuminatable by a light source, the disk pointer being formed in one of a circle or circular ring and being connected to a flexible lead, wherein the lead (8) runs at least approximately concentrically curved in relation to the disk pointer (3) and has two legs (10, 12) joined by a 180° bend (9), a first of said legs (10) resting against a rear (11) of the disk pointer (3) and a second of said legs (12) being fixed to a rear component (13) of the pointer instrument (1), with an axial spacing from the disk pointer (3) and wherein the disk pointer (3) is essentially transparent and, on its said rear (11), in the area of the lead (8) which is placeable thereon, has a section (20) with a reduced transmission.

9. The pointer instrument as claimed in claim 8, wherein said section (20) is formed as an annular recess.

* * * * *